April 7, 1953 D. S. BOND ET AL 2,634,325

ELECTRON BEAM CONTROLLING SYSTEM

Filed Feb. 25, 1950 3 Sheets-Sheet 1

INVENTORS
DONALD S. BOND
& DONALD G. MOORE
BY [signature]
ATTORNEY

INVENTORS
DONALD S. BOND
& DONALD G. MOORE
BY
ATTORNEY

ELECTRON BEAM CONTROLLING SYSTEM

Filed Feb. 25, 1950 3 Sheets-Sheet 3

INVENTORS
DONALD S. BOND
& DONALD G. MOORE
BY
ATTORNEY

Patented Apr. 7, 1953 2,634,325

UNITED STATES PATENT OFFICE 2,634,325

ELECTRON BEAM CONTROLLING SYSTEM

Donald S. Bond and Donald G. Moore, Princeton, N. J., assignors to Radio Corporation of America, a corporation of Delaware Application February 25, 1950, Serial No. 146,283

15 Claims. (Cl. 178—5.4)

This invention relates generally to the control of electron beams, and particularly to systems for effecting registration of an electron scanning beam with predetermined areas of a target electrode scanned by the beam. While it will be appreciated that the present invention is of general utility, it will be illustratively disclosed in conjunction with a color television receiver. For the purpose of reproducing television images substantially in their natural colors, there previously have been used various types of cathode ray tubes capable of producing partial component color images of a television subject. One such tube embodies a luminescent screen consisting of discrete phosphor strips capable, respectively, of emitting differently-colored light when excited by an electron beam. A representative tube of this type is disclosed in U. S. Patent 2,310,863, granted February 2, 1943 to H. W. Leverenz and titled "Luminescent Screen." Each of the phosphor strips has a sub-elemental width such that a group of strips has a combined width which is no greater than one of the dimensions of an elemental image area.

In order to reproduce successfully a color television image, it is necessary that the electronic excitation of the sub-elemental phosphor strips be accurately controlled. For example, in the case where the phosphor strips extend in the direction of horizontal or line scansion of the luminescent screen, it is necessary that the concurrent vertical deflection of the electron scanning beam be precisely linear throughout the entire image-reproducing area. It is quite difficult to achieve such precise vertical deflection linearity with conventional deflection systems. Hence, facilities must be provided for periodically compensating for any tendency of the scanning beam to deviate from precise vertical linearity. Also, it is necessary to accurately control the size and position of the raster on the screen.

Moreover, when a kinescope of the type disclosed in the Leverenz patent referred to is used in a color television image-reproducing system operating according to the dot or elemental multiplex principle, it is necessary that the electron scanning beam be controlled in an additional manner. In accordance with the elemental multiplex principle, signals representing the component color content of each of the successive elemental areas of the image are transmitted according to a time division multiplex plan. Hence, it is necessary to control the excitation of the line type of luminescent screen disclosed in the Leverenz patent in such a manner that the component color phosphor strips are energized in succession for each elemental area of the image. Heretofore the electron beam has been given a color-selecting deflection in addition to the customary horizontal and vertical deflection so as to excite successively the different phosphor strips of a particular group forming a horizontal elemental line of the image. One means by which the color-selecting deflection of the beam is effected is by the use of apertured electrodes located adjacent to the screen. A tube having such an electrode structure is of a somewhat complicated nature. Consequently, it is preferred to use a cathode ray tube in which a single deflecting element, generally located in the vicinity of the electron gun, effects the relatively rapid color-selecting deflection of the scanning beam. For this additional reason, it is imperative that precise registration of the electron beam and the successive groups of phosphor areas be maintained.

In most of the prior art systems for effecting registration of the phosphor-exciting electron beam with the different phosphor areas of a luminescent screen the generation of the signals required to effect precise registration have been derived from the light produced by the luminescent screen. A disadvantage of one type of such system is that the registration signals are dependent upon the intensity of the image-representative light produced by the screen. The light intensity, of course, is subject to considerable variation in accordance with the content of the image. Consequently, at low light levels, it is difficult to distinguish the registration signals from some of the inherent, spurious signal effects generally called noise components.

In another type of prior art registration system, the signals for correcting a deviation from precise linearity of vertical deflection have been derived from auxiliary signal-generating electrodes aligned with the phosphor strips across substantially the entire width of the luminescent screen. Any deviation from the phosphor strip which it is intended to excite by the electron beam causes an impingement of the electrodes by the beam to develop a correcting signal. Such systems also have the disadvantage that the registration signals are dependent upon the video signal modulation of the electron beam.

Accordingly, it is an object of the present invention to provide an improved electron beam registration system for color television image reproduction in which the deficiencies of prior art systems, such as those described, are obviated or at least minimized.

Another object of the invention is to provide an improved electron-beam registration system for use in conjunction with a color kinescope of the type in which the luminescent screen consists of a multiplicity of phosphor strips of sub-elemental width capable, respectively, of emitting differently-colored light.

Still another object of the invention is to provide an improved electron beam registration system in which any misalignment of the electron beam with a group of color phosphor strips is determined immediately preceding the deflection of the beam over the luminescent screen in order to develop a compensating electron-beam deflection voltage by which to effect precise beam registration.

A further object of the invention is to provide an improved electron-beam registration system which is entirely independent of the color components of the image to be reproduced and also of the video signal modulation of the beam.

The invention, while of more general use, is particularly adapted for use in conjunction with a color kinescope of the type wherein the differently-colored phosphor areas of the luminescent screen are in the form of substantially parallel, horizontal strips, each of sub-elemental width. The tube, further, is provided with a marginal signal-generating region which may be obscured from an observer and in which are located a plurality of discrete, secondary electron emissive targets in positions to be impinged by a misaligned electron scanning beam.

Two groups of targets are provided in a three-color system. The targets of the respective groups are arranged in different vertical portions of the marginal screen region. The individual targets of the respective groups are located in the same horizontal lines as individual phosphor strips of two predetermined different colors. As the electron beam is deflected through the marginal region, the sense and magnitude of its mis-alignment with the third color phosphor strips are detected by the character of the secondary electron emission from a pair of the marginal targets. Suitable representative signals are derived from a secondary-electron-collector electrode. These signals may be combined to produce a resultant signal representative of the sense and magnitude of the mis-registration of the electron beam. The mis-registration signal is applied to a deflecting system by which the mis-registration of the electron beam is corrected before it is horizontally deflected over the light-producing region of the screen. In order that the mis-registration signal be entirely independent of the video signals, the determination of the electron beam registration is made during each horizontal blanking period after retrace. At such times the intensity of the electron beam may be controlled independently of the video signals and, hence, may be made uniform for each traversal of the marginal registration signal-generating region.

The novel features that are considered characteristic of this invention are set forth with particularity in the appended claims. The invention, itself, however, both as to its organization and method of operation as well as additional objects and advantages thereof will best be understood from the following description taken in connection with the accompanying drawings:

Figure 1:
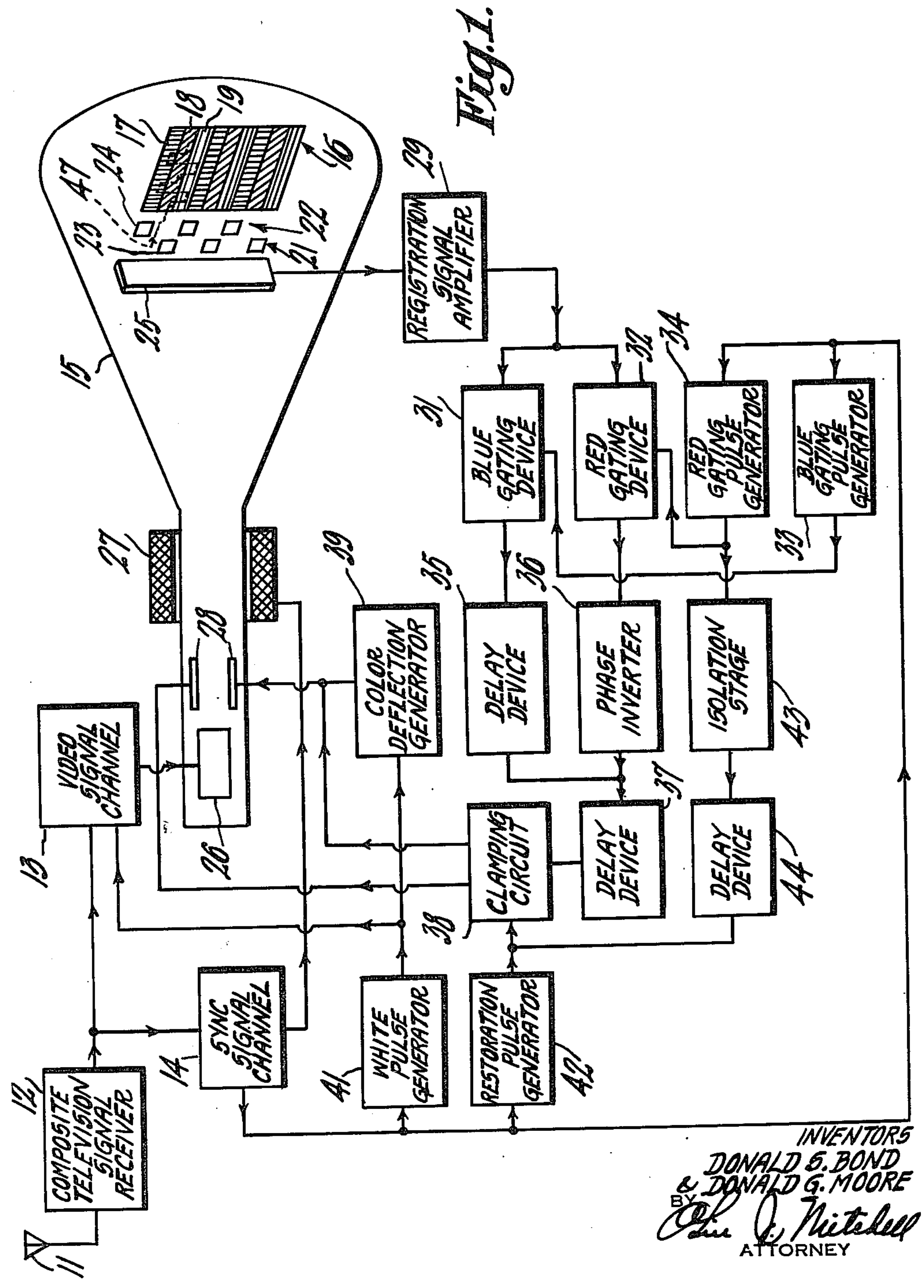
Figure 1 is a block circuit diagram of a color-television signal-receiving and image-reproducing system for embodying one form of the invention.

Referring now to Figure 1 of the drawings, a composite television signal including video and synchronizing signal components is intercepted by an antenna 11 which is coupled to a composite television signal receiver 12. It will be understood that the signal receiver 12 may include such conventional apparatus as one or more stages of radio-frequency signal amplification, a first detector or frequency converter, one or more stages of intermediate-frequency amplification, and a second or signal detector. Accordingly, there is derived from the output circuit of the receiver 12 the demodulated video and synchronizing signal intelligence. The video signals are impressed upon a video signal channel 13 and the synchronizing signals are impressed upon a synchronizing signal channel 14.

The electron beam registration system of the present invention will be understood to be applicable to substantially all of the television systems now being used. Such systems include those operating on the field sequential principle and also those according to the line sequential principle.

It will be assumed, however, that the video signals are of the type corresponding to the dot or elemental multiplex color television signals. Accordingly, the video signal wave has a a varying amplitude, the instantaneous values of which, at predetermined time-spaced intervals, represent the different color components of each of a succession of elemental image areas. Consequently, it will be understood that, for illustrative purposes principally, the video signal channel 13, in addition to including one or more stages of video signal amplification may have incorporated therein suitable apparatus by which to derive from the video signal wave a series of time-spaced pulses representative of the different color components of the successive elemental areas of the images to be reproduced. These pulses are produced concurrently with the instantaneous amplitudes of the video signal wave representative of the elemental color components of the image. The pulses may be employed to modulate the intensity of the electron beam in accordance with the values of the different colors of the image. A system of this character is described in a copending U. S. application of John Evans, Serial No. 111,384 filed August 20, 1949, and entitled "Color Television." The principles underlying the elemental multiplex color television system also are disclosed in the Evans application. Alternatively, the pulses derived from the video signal wave may be employed to key the electron beam for excitation of the luminescent screen at times corresponding to the occurrence of the different instantaneous amplitudes of the video signal wave. In this case, the complete video signal wave may be impressed upon a suitable electrode of an electron gun by which the beam is produced. A system of this latter character forms the subject matter of a copending U. S. application of George C. Sziklai, Serial No. 745,420, filed February 21, 1950, entitled "Color Television Reproducing System." The present invention also includes a color kinescope 15 of a type described in a copending U. S. application of Donald S. Bond, Serial No. 146,282 filed February 25, 1950, entitled "Electron Beam Tubes." A color kinescope of this type is provided with a luminescent screen 16 having a light producing region which consists of a multiplicity of substantially horizontal phosphor strips such as 17, 18 and 19 capable, respectively, of emitting red, green and blue light when excited by an electron beam. The tube also is provided, in a marginal region of the screen, with two vertical groups or columns 21 and 22 of discrete, secondary-electron-emissive targets. The targets of the group 21, of which target 23 is typical, are aligned with the axes of the blue phosphor strips, such as 19. Similarly, the targets, such as 24, of the group 21 are aligned, respectively, with the axes of the red phosphor strips, such as 17. The front face of the kinescope is provided with a suitable mask (not shown) by means of which the marginal target region is obscured from the observer. Adjacent to the marginal targets, there is provided a secondary-electron-collecting electrode 25.

The color kinescope 15 also is provided with a conventional electron gun 26 and electromagnetic deflection yoke 27 by means of which the electron beam is deflected both horizontally and vertically over the screen area to scan a conventional television raster. The kinescope further is provided with a pair of electrostatic deflection plates 28 by means of which there is produced an additional vertical deflection of the electron beam for registration and color-selecting purposes.

The video signals derived from the video signal channel 13 are impressed upon the electron-beam intensity-control electrodes of the electron gun 26 in a conventional manner. Thus, the intensity of the electron beam is varied in accordance with the video signals as it is deflected over the kinescope luminescent screen area. Also, the horizontal and vertical deflection voltages derived from the synchronizing signal channel 14 are impressed upon the magnetic deflection yoke 27 to control the electron beam deflection in the usual manner.

The secondary electron collector 25 is coupled to a registration signal amplifier 29. The output circuit of this amplifier is coupled to a pair of gating devices 31 and 32. The device 32 is referred to herein as a red gating device for the reason that the signals to be produced thereby are derived from the secondary electron emission by the targets of the group 22 aligned with the red phosphor strips. Similarly, the device 31 is referred to as the blue gating device because it functions to produce signal effects derived from the secondary electron emission by the group of targets 21 aligned with the blue phosphor strips.

It will be appreciated that both the red and blue registration information is impressed upon the red and blue gating devices 32 and 31. However, by reason of the location of the target groups 21 and 22 in different vertical areas, the red and blue registration information occurs at different times. Consequently, these two types of signals may be separated by suitably timing the respective operations of the gating devices 31 and 32. For this purpose, there is provided a blue gating pulse generator 33 and a red gating pulse generator 34. The pulses derived from these generators are impressed, respectively, upon the blue and red gating devices 31 and 32 in the desired time relation, which will be described in greater detail subsequently. The blue and red gating pulse generators 33 and 34 are controlled by the horizontal synchronizing pulses derived, as shown diagrammatically, by a coupling to the synchronizing signal channel 14.

Inasmuch as the blue registration signals are developed first in point of time, the output circuit of the blue gating device 31 is coupled to a delay device 35, which may be in the form of a delay line, for example. The amount of delay produced is equivalent to the time by which the red registration signals lag the blue registration signals.

The voltages produced in the respective output circuits of the blue and red gating devices 31 and 32 are of the same phase or polarity. Consequently, in order to derive the desired registration information from these two voltages, it is necessary that they be made of opposite phase. Accordingly, the output circuit of the red gating device 32 is coupled to a phase inverter 36, one of the simplest forms of which is an electron tube. The output circuits of the delay device 35 and the phase inverter 36 are combined, as shown, to derive a resultant voltage representative of the mis-registration of the electron beam, if any, in its traversal of the marginal signal-generating region of the kinescope screen.

The output circuits of the delay device 35 and the phase inverter 36 are coupled through another delay device 37, the purpose of which will be described subsequently, to a clamping circuit 38. The function of the clamping circuit is to develop a substantially constant voltage for a predetermined period of time in response, and corresponding, to a voltage impulse impressed thereon and representative of the electron beam mis-registration, if any. The output of the clamping circuit is coupled, as shown, to the vertical deflecting plates 28.

The electron beam registration system, in accordance with this invention, also includes a color-deflection generator 39 coupled to one of the vertical deflecting plates 28. The voltage produced by the color-deflection generator is of the stair-step type and is employed for the purpose of effecting relatively small vertical deflections of the electron beam for color-selecting excitation of the luminescent screen 16 of the color kinescope 15.

There also is provided a so-called white pulse generator 41 controlled by the horizontal synchronizing signals as indicated by its connection to the synchronizing signal channel 14. This pulse generator serves to increase the intensity of the electron beam substantially to a maximum or other predetermined value during the interval that the beam is traversing the marginal registration signal-generating region of the kinescope screen. For this purpose, it is coupled, as indicated, to the video signal channel 13. It will be understood, accordingly, that the impulse derived from the generator 41 serves to control the video signal amplifier in a manner to produce, in its output circuit, a voltage by which to control the electron beam intensity in the manner described.

The output circuit of the white pulse generator 41 also is coupled to the color-deflection generator 39 to render it inoperative for the production of the stair-step deflection voltage during the interval that the electron beam is traversing the registration signal-generating region of the kinescope screen.

The system also includes a restoration pulse generator 42 controlled by the horizontal synchronizing signals to produce an impulse at a time immediately preceding the development of the impulses by any of the other generators 33, 34 and 41. The restoration pulse derived from the generator 41 is impressed upon clamping circuit 38 to short-circuit it effectively so that it is restored to a predetermined reference voltage. By this means the registration signal voltage impressed upon the vertical deflection plates 28 is removed. The clamping circuit, therefore, is placed in condition to receive any mis-registration signal voltage necessary to align properly the electron beam with the next horizontal line of the kinescope screen to be scanned.

Immediately following, or substantially concurrently with, the impression upon the clamping circuit 38 of the voltage representing any mis-registration of the electron beam with the next horizontal line of the screen area to be scanned, the clamping circuit is energized by an impulse derived from the red gating pulse generator 34. For this purpose the output circuit of the generator 34 is coupled through an isolation stage 43 and a delay device 44 to the clamping circuit 38. The function of the isolation stage 43 is to obviate any coupling through the clamping circuit 38 between the red gating pulse generator 34 and the restoration pulse generator 42. The delay device 44 serves to delay suitably the clamping operation of the circuit 38 to insure that the registration signal-generating apparatus has performed its function of impressing an electron beam mis-registration signal voltage upon the clamping circuit.

The use of the delay device 37 may not be necessary if the clamping circuit 38 is of sufficiently low impedance to avoid oscillation by the transfer of energy around a loop including the registration signal-generating apparatus. In this event the delay device 44 may also be omitted.

A more detailed description of the operation of the system of Figure 1 will be given with additional reference to the curves of Figure 2. It will be understood that predetermined samples of the video signal wave are impressed upon the electron beam intensity control electrodes of the electron gun 26 in the manner described for a system operating in accordance with the dot or elemental multiplex principle. Hence, the intensity of the electron beam is modulated at successive time-spaced intervals in accordance with the sampled instantaneous video signal wave amplitudes.

Furthermore, it will be understood that the synchronizing signal channel 14 includes the necessary horizontal and vertical saw-tooth wave generators for impressing deflection waves upon the yoke 27 to cause the electron beam to scan the usual raster on the luminescent screen 16. It also will be understood that the electron beam is deflected over the marginal signal-generating region of the screen which includes the two groups of target electrodes 21 and 22.

The scansion of the marginal target region is effected during the late portion of each horizontal blanking interval after retrace. A typical pulse establishing the horizontal blanking interval is indicated by the curve 45. The impulse 46 represents a horizontal synchronizing signal occurring during the early part of the horizontal blanking period. The path of the electron beam during a typical horizontal excursion is represented by the dashed line 47 of Figure 1. In traversing the marginal target region, the registration signal voltage resulting from the collection of secondary electrons by the collector 25 is represented by the curve 48 of Figure 2. Under the control of the horizontal synchronizing signal 46, the white pulse generator 41 is operated to produce an impulse 49. The length of this impulse and the timing thereof are made to coincide with the time of traversal of the signal-generating region by the electron beam. Its amplitude is sufficient, when impressed upon the video signal channel 13, to produce an electron beam of relatively high intensity. The reason for this is to secure secondary electron emission from the targets such as 23 and 24 which is independent and distinct from the video signal modulation of the beam.

It is assumed that the electron beam path 47 is not in precise alignment with the green phosphor strip 18. Instead, it is assumed to be in such a direction which, if miantained, will cause it to impinge at least partially upon the red phosphor strip 17. Accordingly, the secondary electron emission from the blue target 23 is less than that from the red target 24. The amplitudes of the signals impressed upon the amplifier 29 are indicated at 50 and 51 of the curve 48 representing, respectively, the blue and red registration signal components. By virtue of the fact that the electron beam traverses the blue target group 21 before the red target group 22, the blue signal component 50 occurs before the red signal component 51.

The entire registration signal wave 48 is impressed concurrently upon the blue and red gating devices 31 and 32, respectively. These gating devices normally are inoperative, thereby preventing the transfer of signal energy to the apparatus coupled to their respective output circuits. Under the control of the horizontal synchronizing signal 46, the blue-gating-pulse generator 33 develops a pulse 52 occurring substantially at the time during which the electron beam 47 is traversing the marginal screen region including the blue target group 21. Accordingly, the blue gating device 31 is operated to transfer the blue registration signal component 50 to the registration signal-developing circuits. Similarly, under the control of the horizontal synchronizing signal 46, the red-gating-pulse generator 34 develops an impulse 53. The time of occurrence of this impulse coincides with the time of traversal of the electron beam through the marginal screen region including the target group 22. Accordingly, the red registration signal component 51 is transferred to the registration signal-generating circuits at this later time.

The blue registration signal component passed by the gating device 31 is retarded in time by the delay device 35. The retardation is equal to the difference between the times of occurrence of the blue and red gating pulses 52 and 53, respectively. Thus, the blue and red registration signal components, when combined for impression upon the delay device 37, coincide in time. However, in order to derive the necessary information from the blue and red signal components, the red component is reversed in polarity by the phase inverter 36. Therefore, the polarity and amplitude of the signal resulting from the combination of the blue and red components represent, respectively, the sense and magnitude of the mis-registration of the electron beam in traversing signal-generating region of the luminescent screen. In the assumed case, the red signal component predominates. Accordingly, the polarity of the resultant registration signal is that of the reversed polarity of the red signal component.

The registration signal is impressed upon the electrostatic deflecting plates 28 in such a manner to deflect the electron beam so that it is precisely aligned with the green phosphor strip 18. In the assumed case, the compensating deflection of the electron beam is downward. It is necessary to maintain this compensated deflection of the beam for the entire time of traversal of the ensuing horizontal line of the scanned raster. The clamping circuit 38 functions in response to the registration signal impulse to maintain the necessary potential between the deflecting plates 28 by which to insure the desired registration of the beam with the group of phosphor strips 17, 18 and 19.

In order to effect proper registration of the beam with the succeeding group of phosphor screen strips, it is necessary that the correcting potential be removed from the deflecting plates 28 prior to the next traversal by the beam of the marginal registration signal-generating region. This is accomplished by means of a restoration pulse 54 of Figure 2. The restoration pulse is developed by the restoration pulse generator 42 of Figure 1 under the control of the horizontal synchronizing pulse such as 46. It is produced at a time just preceding the scansion of the registration signal-generating area by the electron beam. The restoration pulse 54 is impressed upon the clamping circuit 38 in a manner to eliminate any previously established clamping voltage. The clamping circuit thus is placed in a condition to respond to another registration signal voltage representing any mis-registration of the electron beam with the succeeding group of phosphor strips. Consequently, as the electron beam is deflected through the registration signal-generating region, its vertical position is determined solely by the usual deflection system including the magnetic yoke 27.

As soon as the electron beam is deflected horizontally to the point where it is about to impinge upon the light-producing region of the luminescent screen 16, it is brought into precise registry with the green phosphor strip, such as 18, in the manner described. For the remainder of its horizontal deflection, a color-selecting vertical deflection of the beam is effected by the deflecting plates 28 energized by the color deflection generator 39. The path traced by the beam over the phosphor strips 17, 18 and 19 as a result of this deflection is indicated by the dashed line 47 in Figure 1. It will be noted that, in the first instant, the beam impinges upon the green phosphor strip 18. In the next succeeding instant, it is deflected downwardly to impinge upon the blue phosphor strip 19. During the third instant, it is upwardly deflected to impinge upon the red phosphor strip 17. For the fourth instant, it is deflected downwardly in an amount sufficient to cause it again to impinge upon the green phosphor strip 18. The color-selecting deflection is continued in such a manner for the remainder of the horizontal line. In accordance with the elemental multiplex principle, it is necessary that a complete cycle of the described color-selecting deflection of the beam be accomplished during the time required to scan one elemental area of the image. The cyclic color-selecting deflecting of the beam is repeated for each elemental area of each horizontal line of the image.

During the times that the beam is in position to impinge upon the green phosphor strip 18, the video signal wave is amplified in the video signal channel 13 so as to impress upon the intensity control electrodes of the electron gun 26 a video signal representative of the green component of the elemental area of the image being reproduced. Similarly, during the times when the electron beam is in position to impinge upon the red and blue phosphor strips 17 and 19, the intensity thereof is modulated in accordance with the red and blue components, respectively, of the elemental area being reproduced. In this manner, all of the component colors of all the elemental areas of each horizontal image line are reproduced while the electron beam is being deflected through one horizontal line of the raster.

In order to disclose more completely some of the less well-known components of the system of Figure 1, additional reference is made to the other figures of the drawings. In Figure 3, for example, there is shown in greater detail the essential components of any one of the pulse generators 33, 34, 41 and 42. The blue gating-pulse generator 33 has been selected for purposes of illustration. In describing the arrangement of parts and the operation thereof, additional reference will be made to Figure 2. The blue-gating-pulse generator 33 includes an input amplifier 55 which is coupled to the synchronizing signal channel 14 for response to horizontal synchronizing pulses. A typical horizontal synchronizing pulse is shown at 56. Its leading edge occurs at a time $T_1$ on the time scale illustrated in Figure 2. The synchronizing pulse 56 is reversed in polarity by the input amplifier so that a pulse 57 is impressed upon a pulse timing multivibrator 58 by means of an isolating stage such as a diode 59.

Figures 2, 3:
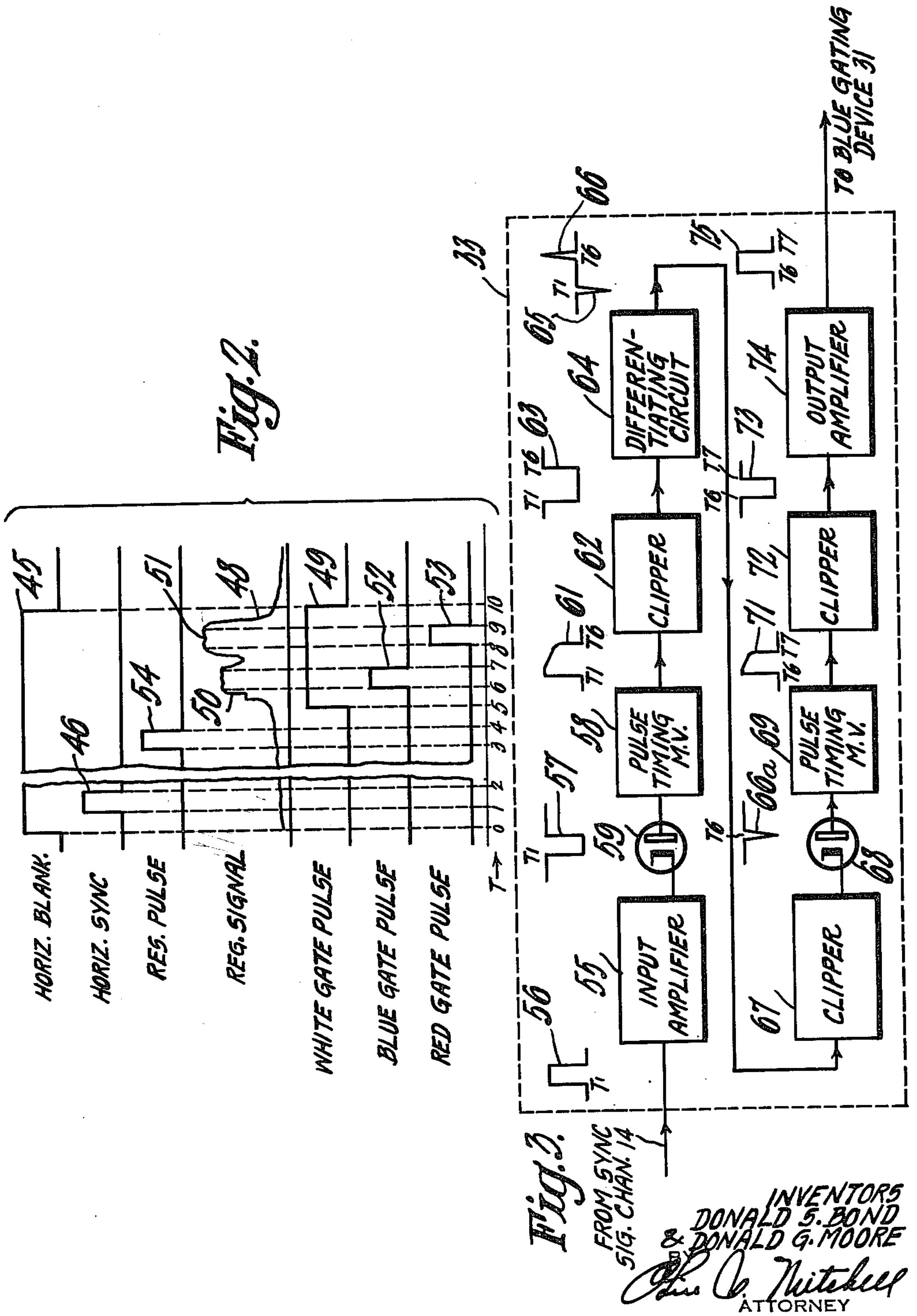
Figure 2 is a series of curves representing typical waveforms appearing in different parts of the circuits of Figure 1.
Figure 3 illustrates the major circuit components of a typical pulse generator shown in block diagram form in Figure 1.

The function of the multivibrator 58 is to properly time the occurrence of the leading edge of the blue gating pulse 52 of Figure 2 with reference to the horizontal synchronizing pulse 46. The pulse timing multivibrator is a monostable or flip-flop type of multivibrator. Such devices are well known in the art, a typical example of which may be found in the book entitled "Time Bases" by Puckle, published in New York by John Wiley and Sons, Inc., and in London by Chapman and Hall, Ltd. Either one of the forms shown at pages 50 and 51, in Figures 27 and 28, respectively, of the reference may be used. In general, a monostable multivibrator is one which has one stable and one unstable state. In response to a triggering pulse the device is operated from its stable to its unstable state. Without any external control it subsequently reverts to its stable state. The time during which it remains in its unstable state is determined by the circuit constants of the device. In the present case, the pulse timing multivibrator 58 is operated from its stable to its unstable state in response to the impression thereon of the leading edge of the inverted horizontal synchronizing pulse 57. This occurs at time $T_1$. The pulse 61 is developed by reason of the multivibrator 58 remaining in its unstable state until time $T_6$ which, it will be noted, is the time of occurrence of the leading edge of the blue gating pulse 52 of Figure 2.

It will be seen that the pulse 61 does not have a rectangular waveform. This is characteristic of pulses developed by multivibrators. Accordingly, the pulse 61 is impressed upon a clipper 62. The clipper may be an entirely conventional device consisting, for example, of an electron tube biased in a manner to be driven to saturation by impressed voltages having a magnitude not greater than the steep-sided trailing edge of the pulse 61. Accordingly, there is developed in the output circuit of the clipper a pulse 63 which has a width or time duration extending between times $T_1$ and $T_6$.

The pulse 63 is impressed upon a differentiating circuit 64 of conventional design for the derivation of two relatively sharp, narrow pulses 65 and 66 of opposite polarity occurring respectively at times $T_1$ and $T_6$.

The pulses 65 and 66 are impressed upon another clipper 67 which is designed to pass only pulses of one polarity which, in this case, is the pulse 66. The clipped pulse 66*a* is impressed, by means of an isolating stage such as a diode 68, upon a pulse length multivibrator 69.

This multivibrator also is of the monostable type and is triggered by the pulse 66*a* from its normal stable state to its unstable state. A pulse 71 is produced in the output circuit of the multivibrator 69. It may be seen that the leading edge of this pulse occurs at time $T_6$ which coincides with the leading edge of the blue gating pulse 52 of Figure 2. The circuit constants of the multivibrator 69 are of such a character to control the length of the pulse 71 so that it terminates at time $T_7$ which, it may be seen, coincides with the time of occurrence of the trailing edge of the blue gating pulse 52 of Figure 2.

The pulse 71 is impressed upon a clipper 72 by which a substantially rectangular pulse 73 is developed. The pulse 73 is amplified suitably by an output amplifier 74 to produce a pulse 75 of proper polarity to impress upon the blue gating device 32 of Figure 1. It will be seen that the pulse 75, beginning at time $T_6$ and ending at time $T_7$, corresponds to the blue gating pulse 52 of Figure 2.

It will be understood that the other pulse generators of Figure 1 may be substantially identical to the blue gating pulse generator 33 of Figure 3. The differences consist essentially in the circuit constants of the monostable multivibrators such as 58 and 69 of Figure 3. In general, the pulse-timing multivibrators corresponding to multivibrator 58 of Figure 3 are adjusted to develop pulses having respective widths or time durations equivalent to the difference between the times of occurrence of the leading edges of a horizontal synchronizing pulse and the control pulse being developed. Likewise, the circuit constants of the pulse-length multivibrator corresponding to multivibrator 69 of Figure 3 are adjusted to develop pulses having respective widths or time durations equal substantially to that of the pulse being developed.

Figures 4, 5:
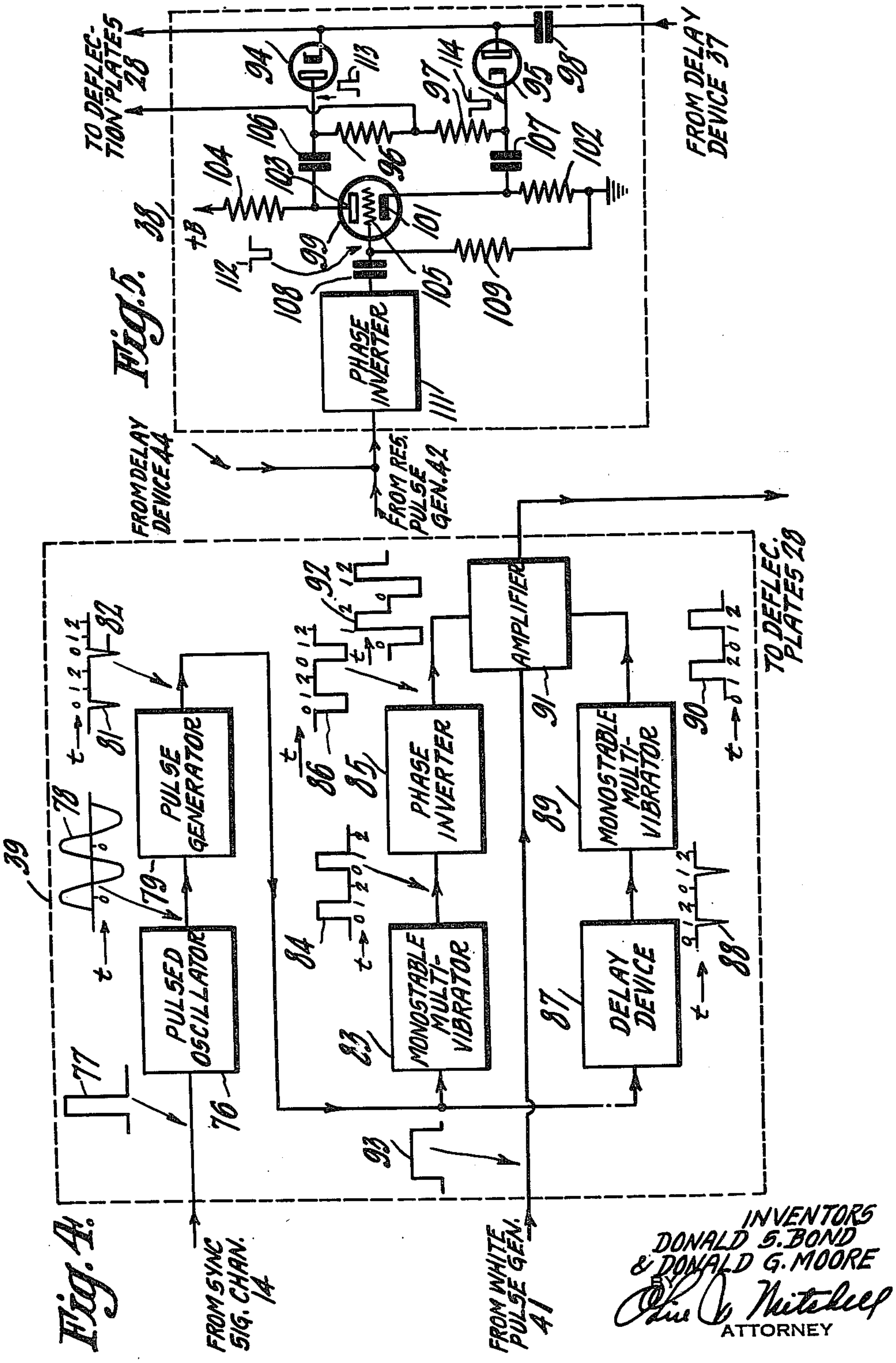
Figure 4 shows in greater detail the essential circuit components of an electron-beam deflection generator shown diagrammatically in Figure 1 for effecting color-selecting deflection of an electron beam.
Figure 5 is a circuit diagram of a typical clamping circuit for use in the system of Figure 1.

One type of color-deflection generator 39 which has been successfully employed in the operation of a system of the character described is shown in Figure 4. It includes a pulsed oscillator 76 which is coupled for control of the synchronizing signal channel 14 of Figure 1. One type of oscillator which may be used is that shown in the book entitled "Waveforms" published by McGraw-Hill Book Co., Inc., at page 143, Figs. 4–45. Essentially, it is a free-running sine-wave oscillator susceptible of frequency and phase control by pulses impressed periodically thereon. In the present case, as also in the copending Evans application referred to, the oscillator 76 is controlled by the horizontal synchronizing pulses such as the pulse 77. There is developed by the oscillator 76 a sinusoidal voltage wave 78 having a frequency equal to the frequency at which the elemental image areas are to be reproduced. It will be noted that the positive peaks or crests of the wave 78 occur at times designated as $t_0$.

The sinusoidal voltage wave 78 is impressed upon a pulse generator 79 which may be a conventional electron tube biased so as to be conductive only in response to the impression thereon of voltages corresponding to the positive peak voltage of the wave 78. Alternatively, the sinusoidal wave may be converted to a substantially rectangular form by a limiter and sharp impulses derived therefrom by a differentiating circuit. Accordingly, there is produced in the output circuit of the pulse generator a series of pulses such as 81 and 82. These pulses occur at times designated as $t_0$. The interval between the occurrence of two succeeding pulses such as 81 and 82 may be considered as divided into three equal parts. Thus, a cycle of the pulses such as 81 and 82 may be considered as comprising three substantially equal time-spaced intervals designated respectively as $t_0$, $t_1$ and $t_2$.

The pulses 81 and 82 are impressed upon a circuit having two substantially parallel branches. One branch includes a monostable multivibrator 83 of the type previously described. It is capable of producing a series of pulses such as 84 having leading edges occurring at times $t_0$ and trailing edges occurring substantially at times $t_1$.

The pulses such as 84 are impressed upon a phase inverter 85 by which there is produced a series of pulses such as 86 having the same timing as the pulses 84 but being reversed in polarity thereto.

The other branch of the circuit upon which the pulses 81 and 82 are impressed includes a delay device 87. The parameters of this device are such that the impressed pulses are delayed until times $t_1$ as indicated, for example, by the pulse 88.

The pulses such as 88 are impressed upon another monostable multivibrator 89 which may be identical to the multivibrator 83. In this manner, there is produced in the output circuit of the multivibrator 89 a series of pulses, such as 90. It will be seen that these pulses are of opposite polarity to the pulses 86 and occur at somewhat later times. The leading edges of the pulses such as 90 occur at times $t_1$ and the trailing edges at times $t_2$.

The pulses 86 and 90 derived from the output circuits of the phase inverter 85 and the multivibrator 89 are combined in output amplifier 91 to produce a stair-step voltage wave, such as indicated at 92. This wave is impressed upon the deflection plates 28 of Figure 1 to selectively control the vertical color-selecting deflection of the electron beam in the manner described.

It is necessary to prevent the color deflection generator 39 from impressing the stair-step voltage wave 92 of Figure 4 upon the deflection plates 28 during the time that the electron beam is being deflected through the signal-generating region of the kinescope screen. Accordingly, a white gating pulse 93 is impressed upon the color deflection generator 39 to render it inoperative. For example, the white gating pulse 93 may be impressed in suitable polarity upon the input circuit of the amplifier 91 to bias the amplifier to cutoff, thereby preventing its response to the pulses 86 and 90.

Referring now to Figure 5 of the drawings, there are shown the circuit details of the clamping circuit 38 of the system of Figure 1. The clamping circuit which it is preferred to use in this system is of the so-called double-keyed type. A typical example of this type of clamping circuit is disclosed in U. S. Patent 2,299,945, issued October 27, 1942 to Karl R. Wendt and entitled "Direct Current Reinserting Circuit." A pair of diodes 94 and 95 are interconnected, with the anode of diode 94 coupled to the cathode of diode 95 through a pair of substantially equal resistors 96 and 97. The cathode and anode of the diodes 94 and 95, respectively, are directly connected together and are coupled by a capacitor 98 to the output circuit of the delay device 37 of Figure 1. The directly connected cathode and anode of the diodes 94 and 95, respectively, are connected to one of the deflection plates 28 as indicated in Figure 1. The junction point between the resistors 96 and 97 is connected to a point of relatively fixed potential such as, for example, the other one of the deflecting plates 28 as indicated in Figure 1.

The diodes 94 and 95 are coupled to a keying circuit which includes an electron tube 99. The cathode 101 of this tube is connected to ground or other point of fixed potential through a load resistor 102. The anode 103 of the tube 99 is connected to a source of uni-directional space current for the tube indicated at +B through a second load resistor 104. Preferably, the load resistors 102 and 104 are of equal values. The anode of the tube 99 is coupled to the anode of the diode 94 by a capacitor 105. Similarly, the cathode of the tube 99 is coupled to the cathode of the diode 95 by a capacitor 106. Preferably, the capacitors 105 and 106 are of substantially equal values.

The space-current control grid 107 of the tube 99 is coupled by a capacitor 108, for which a leak resistor 109 is provided, to the output of a phase inverter 111. The input of the phase inverter is coupled to the output of the restoration pulse generator 42 and also to the output of the delay device 44, as indicated in Figure 1.

The operation of the clamping circuit 38 is controlled jointly by the red gating and restoration pulses 53 and 54, respectively, of Figure 2. The red gating pulse 53 serves to set and maintain or clamp upon the deflection plates 28 the voltage required to re-orient the electron beam for precise registration with the green phosphor strip of each of the successive horizontal groups of screen strips. The restoration pulse 54 serves to restore the clamping circuit 38 to normal, prior to the deflection of the electron beam over the signal generating target region for each of the successive horizontal lines of the image to be reproduced.

Normally, in the absence of the impression of the keying pulses upon the control grid 107 of the tube 99, the tube is biased for the conduction of space current. Since the keying pulses derived respectively from the restoration pulse generator 42 and the delay device 44 are of positive polarity, they are converted into pulses of negative polarity by the phase inverter 111. The impression of one of the negative impulses represented at 112 upon the control grid 107 of the keying tube 99 drives the tube beyond cutoff so as to interrupt completely the conduction of space current in the tube. As a result, there is developed at the anode 103 of the tube a positive pulse as indicated at 113. Likewise, there is developed at the cathode 101 of the tube a negative pulse as indicated at 114.

The impression of the positive pulse 113 upon the anode of the diode 94 and the concurrent impression of the negative impulse 114 upon the cathode of the diode 95 conditions both of the diodes for conduction through the resistors 96 and 97. If there is no voltage impressed upon the cathode and anode of the diodes 94 and 95, respectively, through the coupling capacitor 98, it is seen that, by reason of the conductivity of the diodes, both of the deflection plates 28 of the kinescope 15 of Figure 1 are brought to substantially the same potential. If, however, during the period of conductivity of the diodes a voltage pulse is impressed upon the capacitor 98, there will be established across this capacitor a unidirectional potential difference having a magnitude and polarity corresponding to the respective magnitude and polarity of the voltage pulse derived from the delay device 37.

When the keying tube 99 is restored to its normal conducting state following the termination of the keying pulse 112, the diodes 94 and 95 are restored to their non-conducting states. Consequently, the potential to which the capacitor 98 is charged is impressed upon the deflecting plates 28 at this time. This potential difference between the deflecting plates is maintained until the occurrence of the next succeeding keying pulse.

Accordingly, with reference to the timing of the keying pulses 53 and 54 of Figure 2, it may be seen that, under the control of the restoration pulse 54 the clamping circuit 38 is restored to its normal condition sometime prior to the traversal of the marginal signal-generating region of the kinescope screen by the electron beam. Thus, there is no correcting voltage impressed upon the deflecting plates 28 so that the vertical position of the electron beam relative to the phosphor strips of a group is determined solely by the magnetic deflection system including the yoke 27 during the beam traversal of the signal-generating region.

It may be seen that the deflection control system of the invention provides precise registration of an electron beam with predetermined portions of a target scanned by the beam. It obviously is not limited to color television receivers. On the contrary, it may be used with camera tubes, such as the well-known iconoscope, orthicon, and image-orthicon, for example. Furthermore, it may be used advantageously in black and while television systems. It is contemplated that the deflection control system of the invention may be even more generally used to effect registration of the beam with types of targets other than those of television tubes. For example, a so-called deflection type of cathode ray tube has a target with one or more discontinuities for signal-amplification and similar purposes.

Specifically for television or other purposes the color deflection generator 39, instead of producing a stair-step voltage wave, may develop a sinusoidal voltage by which to deflect the electron beam. For a black and while television system no deflection generator of this type is necessary. The registration system may be used to advantage in any type of color television system, including elemental multiplex, line and field sequential systems.

Not only is line-to-line registration effected precisely by means of the present system, but also raster size and position on the kinescope screen may be accurately controlled. Such an attribute is beneficial both in receiver and in camera tubes of a television or similar system.

The nature of the invention may be determined from the foregoing illustrative embodiment thereof. Its scope is defined in the following claims.

What is claimed is:

1. A television image reproducing system comprising a color kinescope having a luminescent screen including a plurality of groups of substantially parallel strips of material capable respectively of producing light of the different component image colors in response to excitation by an electron scanning beam, said kinescope also having in a marginal region adjacent to one edge of said screen an electron-sensitive electrode structure to be traversed by said beam for generating signals representative of the orientation of said beam with successive groups of said screen strips, means including auxiliary beam-deflecting apparatus responsive to said generated signals to effect a desired orientation of said beam with successive groups of said screen strips, means responsive to a received video signal wave having instantaneous amplitudes representative respectively of the different component color values of successive elemental image areas for correspondingly modulating the intensity of said beam during traversal of said screen, and means for impressing a color-selecting wave of predetermined form upon said auxiliary beam-deflecting apparatus to deflect said beam for selective excitation of the different color-producing strips of successive groups of said strips in coincidence with video signal intensity modulation of said beam.

2. A color television image-reproducing system as defined in claim 1, wherein said generated signals are time-spaced pulses, and including additionally gating devices coupled to said signal-generating electrode structure for segregating said pulses, and means including a delay device for effecting coincidence of said pulses.

3. A color television image-reproducing system as defined in claim 2, wherein said time-spaced pulses are of the same polarity, and including additionally means including a phase inverter coupled to one of said gating devices for converting said generated pulses to pulses of different polarities.

4. A color television image reproducing system as defined in claim 1, wherein said signal-generating electrode structure comprises a plurality of secondary electron emissive targets aligned with predetermined screen strips, and including additionally a secondary electron collector mounted adjacent to said targets and coupled to said auxiliary beam deflecting apparatus.

5. A color television image-reproducing system as defined in claim 1, including means comprising electromagnetic beam-deflecting apparatus for effecting scanning deflection of said beam and said auxiliary beam-deflecting apparatus comprising a pair of electrostatic plates.

6. A color television image-reproducing system as defined in claim 1, including additionally means for effecting a predetermined intensity modulation of said beam during traversals of said signal-generating electrode structure.

7. A color television image-reproducing system as defined in claim 1, wherein said color-selecting wave has a stepped form of different amplitude levels coinciding respectively with said instantaneous video wave amplitudes.

8. A television image-reproducing system comprising, a color kinescope having a luminescent screen including a plurality of groups of substantially horizontal strips of material capable respectively of producing light of the different component colors of the image in response to excitation by an electron beam, a plurality of secondary electron emissive targets located in a marginal region adjacent to one vertical edge of said screen, said targets being arranged in two vertical columns with the targets of the two columns aligned respectively with first and second sets of noncentral strips of said groups of screen strips, a secondary electron collector mounted adjacent to said targets, means for developing and electromagnetically deflecting an electron beam over said screen and said marginal target region according to a predetermined pattern, a pair of electrostatic vertical beam-deflecting plates, means coupled to said collector for developing time-spaced registration signals of the same polarity and relatively representative of any deviation of said beam in traversing said target region from registration with central strips of said groups of screen strips, means for delaying one of said registration signals to effect coincidence with the other of said registration signals, means for reversing the polarity of said other registration signal, means for combining said delayed and reversed polarity registration signals to produce a correcting signal having polarity and amplitude representative respectively of the sense and magnitude of said beam deviation, means for impressing said correcting signal upon said deflecting plates to effect registration of said beam with said central screen strips, means for effecting maximum intensity modulation of said beam during traversal of said target region, means responsive to a received video signal wave having instantaneous amplitudes representative respectively of the different component color values of successive elemental areas of the image for correspondingly modulating the intensity of said beam during traversal of said screen, and means for impressing a stepped voltage wave upon said deflecting plates to deflect said beam vertically for selective excitation of the different color-producing strips in coincidence with said video signal intensity modulation of said beam.

9. An electron beam deflection control system for a color television receiver embodying a kinescope having a luminescent screen including a multiplicity of groups of substantially horizontal strips of material capable respectively of producing light of the different component colors of an image to be reproduced in response to excitation by an electron beam deflected over said screen, said kinescope also having electrode structure adjacent to one edge of said screen to generate registration signals responsive to traversal thereof by said beam and representative of the orientation of said beam with successive groups of said screen strips, said control system comprising, beam-deflecting means adjacent to said electron beam path and energizable to effect registration of said beam with successive groups of said screen strips, means for developing correcting signals from said registration signals, means for energizing said beam-deflecting means by said correcting signals, and means including a clamping circuit responsive to said correcting signals for maintaining said correcting signal energization of said beam-deflecting means during each of a succession of horizontal beam deflections over said screen.

10. An electron beam deflection control system as defined in claim 9, wherein said registration signals are time-spaced pulses, and including additionally gating devices coupled to said signal-generating electrode structure, and respective gating pulse generators coupled to said gating devices to operate said devices successively for the segregation of said registration signals.

11. An electron beam deflection control system as defined in claim 10, and including additionally means coupling one of said gating pulse generators to said clamping circuit to condition said circuit for the storage of said correcting signal energy.

12. An electron beam deflection control system as defined in claim 11, wherein said coupling means includes a device to delay the impression of said gating pulses upon said clamping circuit to insure completion of the development of said correcting signals.

13. An electron beam deflection control system as defined in claim 9, including additionally keying means coupled to said clamping circuit and effective immediately after the generation of said registration signals to condition said clamping circuit for the storage of said correcting signal energy.

14. An electron beam deflection control system as defined in claim 13, including additionally keying means coupled to said clamping circuit and effective immediately before the generation of said registration signals to condition said clamping circuit for the release of stored correcting signal energy.

15. An electron beam deflection control system comprising, an electron-beam tube having a target electrode and adjacent thereto an electrode structure including a plurality of discrete electron-emitting elements arranged in a plurality of groups, means for developing an electron beam and deflecting it over said target electrode and said electrode structure, said beam deflection over said electrode structure effecting the generation of time-spaced signals representative of the orientation of said beam with different predetermined parts of said target electrode, means coupled to said electrode structure to convert groups of said time-spaced signals respectively to beam mis-registration signals, and means including beam-deflecting apparatus responsive to said mis-registration signals to effect a desired orientation of said beam with said target electrode.

DONALD S. BOND.
DONALD G. MOORE.

REFERENCES CITED

The following references are of record in the file of this patent:

UNITED STATES PATENTS

| Number | Name | Date |
|---|---|---|
| 2,415,059 | Zworykin | Jan. 28, 1947 |
| 2,490,812 | Huffman | Dec. 13, 1949 |